United States Patent [19]

Schmidt

[11] Patent Number: 5,234,065
[45] Date of Patent: Aug. 10, 1993

[54] PORTABLE WEIGHT MEASURING DEVICE

[76] Inventor: Karl B. Schmidt, 4040 Crockers Lake Blvd. #1722, Sarasota, Fla. 34238

[21] Appl. No.: 980,546

[22] Filed: Nov. 23, 1992

[51] Int. Cl.⁵ .................... G01G 21/00; G01G 5/04
[52] U.S. Cl. ................. 177/209; 177/126; 177/208; 177/254
[58] Field of Search ............ 177/126, 208, 209, 254

[56] References Cited

U.S. PATENT DOCUMENTS

| | | | |
|---|---|---|---|
| 4,431,072 | 2/1984 | Stepp | 177/209 |
| 4,489,799 | 12/1984 | Menon | 177/209 |
| 4,537,266 | 8/1985 | Greenberg | 177/208 |
| 4,583,606 | 4/1986 | Menon | 177/208 |
| 4,782,905 | 11/1988 | Lam | 177/208 |

OTHER PUBLICATIONS

Electronics World+Wireless World, Aug. 1992, "Pressure Measurement", p. 692.

Primary Examiner—Benjamin R. Fuller
Assistant Examiner—Randy W. Gibson
Attorney, Agent, or Firm—Charles J. Prescott

[57] ABSTRACT

A portable weight measuring device including a plurality of flat, flexible generally nonelastic fluid-containing bladders arranged edge to edge and interconnected by flexible tubes for fluid flow between the bladders. Flat, rigid upper and lower support plates, generally similar in size to each bladder, are positioned against each bladder upper and lower surface so that the upper support plates collectively define a flat weight bearing surface and the lower support plates collectively define a flat ground engaging surface which is parallel and spaced from, but on close proximity to, the weight bearing surface by the relatively small thickness of the bladders. A pressure sensing and converting unit is in fluid communication with a closed fluid circuit defined by the bladders and interconnecting tubes; the pressure sensing and converting unit producing an electrical signal output proportional to the weight of an object placed atop the device to a visual readout means which provides viewable indicia of the weight of the object. An upper and lower flexible protective cover sheet surrounds this arrangement, sealed closed along their mating margins, the upper cover sheet having a viewing aperture formed therethrough in alignment and registry with the visual readout means. By selective arranging and spacing of the bladders, the device is made foldable into a compact stored configuration.

3 Claims, 2 Drawing Sheets

PORTABLE WEIGHT MEASURING DEVICE

BACKGROUND OF THE INVENTION

This invention relates generally to weight measuring devices, and more particularly to a portable and foldable compact weight measuring device utilizing an arrangement of sealed fluid containing bladders.

In our extremely weight conscious society, the need to know one's weight on a weekly, daily and sometimes hourly basis has become and obsession. Almost all who are on a diet of one form or another have an accurate weight scale in their residence. Additionally, offices, banks and many supermarkets also provide public access to weight scales so that individuals can easily monitor progress (or failure) at loosing or controlling body weight.

However, when one travels, the intermediate and final destinations many times do not have an accessible weight scale available. Virtually all of the presently available weight scales for home and office use are far too cumbersome to be carried along with other baggage and therefore the nervous tension which develops from not knowing one's body weight fluctuations heightens during the trip away from access to these weight scales - many times igniting nervous appetites.

The above is only one example of the need for a portable, compactible light weight scale for weighing objects.

Prior art discloses U.S. Pat. No. 4,537,266 teaching a portable compactible scale invented by Greenberg. This device includes a finger-like compactible bladder containing non-compressible fluid. The device itself is made compactible by rolling it into a cylindrical shape from its flat in-use configuration.

A weight and pressuring measuring device invented by Burkhardt as set forth in U.S. Pat. No. 4,909,339 teaches a water and pressure measuring device having a fluid filled cushion pad connected to a pressure indicator. The device, which measures pressure produced by a weight load applied thereatop also includes a thin stepping pad which may be rolled up or outstretched above the cushion pad to increase the solidity of the support for the object to be weighed.

U.S. Pat. No. 4,431,072 discloses a weighing device invented by Stepp for determining the axle load weight of a vehicle and includes a platform with tire guide rails and inflatable air bags. An air pressure gauge connected to the air bags is provided to measure the vehicle axle weight.

Another device for measuring the axle weight of vehicles such as trucks and the like is disclosed in U.S. Pat. No. 3,698,492 invented by Lejeune. This device is a hydraulic balance having two deformable parallel tubes each containing a fluid under pressure each of which is measured separately.

Three other weight measuring devices are known to applicant, the first being a weight apparatus disclosed in U.S. Pat. No. 1,936,178 invented by Sykes, a second disclosed in U.S. Pat. No. 2,857,152 invented by Aske and a third, a hydraulic bellow-type scale invented by Chen disclosed in U.S. Pat. No. 4,366,876. These devices are quite dissimilar to that of the present invention.

The present invention provides a portable, easily transportable weight scale particularly useful for individuals while traveling, but also useful in any situation where a relatively light duty, thin, transportable weight scale is required. The device includes a plurality of flat fluid filled bladders arranged side by side and interconnected by fluid carrying tubular conduits. Rigid upper and lower plates positioned against the upper and lower surfaces of each bladder define parallel spaced working and ground engaging surfaces, respectively, which serve to pressurize the bladder arrangement when a load is applied so that a pressuring sensing and converting unit may produce an electrical signal to a digital readout for determining the weight of the object atop the bladder arrangement. The device is easily foldable for convenient transporting and may be provided in a broad range of sizes and configurations, depending upon the application.

BRIEF SUMMARY OF THE INVENTION

This invention is directed to a portable weight measuring device including a plurality of flat, flexible generally non-elastic fluid-containing bladders arranged edge to edge and interconnected by flexible tubes for fluid flow between the bladders. Flat, rigid upper and lower support plates, are generally similar in size to each bladder, are positioned against each bladder upper and lower surface so that the upper support plates collectively define a flat weight bearing surface and the lower support plates collectively define a flat ground engaging surface which is parallel and spaced from, but in close proximity to, the weight bearing surface by the relatively small thickness of the bladders. A pressure sensing and converting unit is in fluid communication with a closed fluid circuit defined by the bladders and interconnecting tubes; the pressure sensing and converting unit producing an electrical signal output proportional to the weight of an object placed atop the device to a visual readout means which provides viewable indicia of the weight of the object. An upper and lower flexible protective cover sheet surrounds this arrangement, sealed closed along their mating margins, the paper cover sheet having a viewing aperture formed therethrough in alignment and registry with the visual readout means. By selective arranging and spacing of the bladders, the device is made foldable into a compact stored configuration.

It is therefore an object of this invention to provide a portable, easily transportable weight scale which is relatively thin and light weight and economical to manufacture.

It is another object of this invention to provide a portable weight scale which provides very accurate weight readout of any object placed anywhere thereatop.

It is another object of this invention to provide a foldable and portable body weight measuring device which is easily transportable by an individual within conventional light weight clothing carriers and the like.

It is yet another object of this invention to provide a compact foldable weight measuring device which incorporates current high-tech fluid pressure sensing and converting components for improved repeatability, temperature compensation, reduced hysteresis, improved sensitivity and stability.

In accordance with these and other objects which will become apparent hereinafter, the instant invention will now be described with reference to the accompanying drawings.

DETAILED DESCRIPTION OF THE INVENTION

Figure 1:
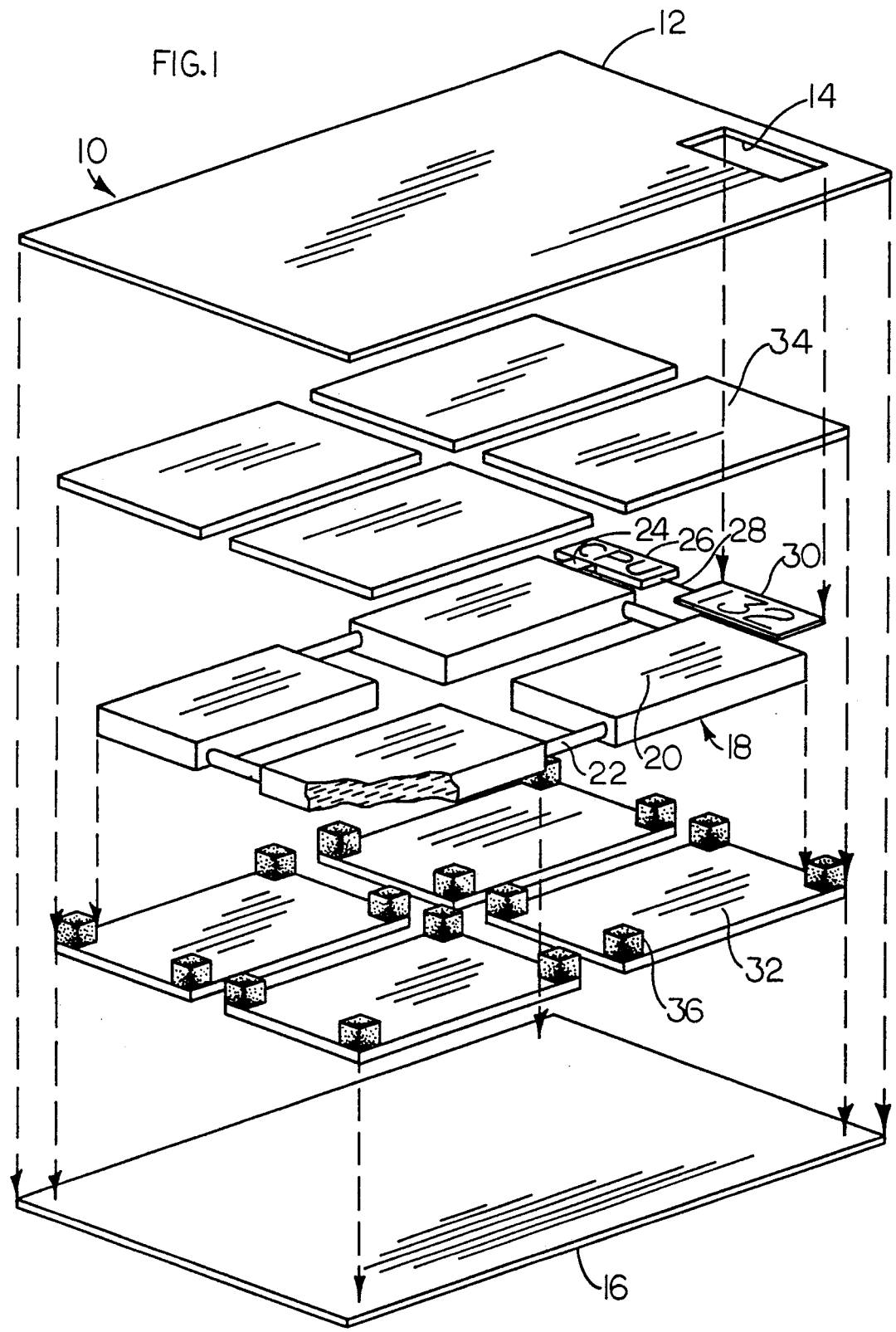
FIG. 1 is a perspective exploded view of the invention.

Referring now to the drawings, the invention is shown generally at numeral 10 and includes a thin flexible upper cover sheet 12 formed of flexible, but relatively inextensible MYLAR or like material. This upper cover sheet 12 includes a viewing aperture 14 positioned as will be described herebelow. A lower flexible, generally non-extensible cover sheet 16, also formed of thin MYLAR-type material is edge connected along its common margins to the upper cover sheet 12 to form a sealed enclosure for the arrangement shown in FIG. 1 therebetween.

The device 10, within the sealed, generally flat rectangular envelope defined by the upper and lower cover sheets 12 and 16, respectively, includes a bladder arrangement 18 comprising a plurality of flat, fluid filled generally rectangular bladders 20 which are positioned and spaced edge to edge one to another in an array as shown. Each of the bladders 20 contains a fluid such as hydraulic brake fluid or other suitable non-compressible fluid, gel or the like. Adjacent bladders 20 are interconnected and in fluid communication one to another by sealed flexible tubular conduits shown typically at 22. One of the bladders 20 includes an additional pressure readout conduit 24 which is sealedly interconnected to a pressure sensing and converting central processing unit (CPU) 26. The entire arrangement 18 of flexible bladders 20, interconnecting flexible tubular members 22, pressure readout outlet 24 and CPU unit 26 define a closed, pressurizable fluid system. The CPU unit 26 will be described herebelow and produces an electric output signal at 28 which is fed into a liquid crystal display (LCD) 30 for displaying a visual electrical signal which is calibrated to be proportionate to the weight applied atop the device 10.

Each of the flexible bladders 20 is protected by individual flat, rigid, relatively thin upper and lower and lower support plates 34 and 32, respectively. These support plate 32 and 34 are sized and shaped to be generally similar to each of the bladders 20, the upper plates 34 collectively defining a flat or planar weight bearing surface, the lower support plates 32 defining a flat, planar ground engaging surface.

Positioned at each corner of each bladder 20 is a compressible foam spacer 36 which serves to space each pair of upper and lower support plates 34 and 34, respectively apart so as to provide an adequate gap therebetween generally equal to the thickness of the bladders 20. These compressible members relieve internal fluid pressure within the bladders 20 when not in use.

By this arrangement, when an object to be weighed is placed atop the upper cover sheet 12, the upper support plates 34 act to compress the bladders 20, thus producing hydraulic pressure within the closed fluid circuit previously defined. Some squeezing of the spacers 36 is encountered, the degree of which is dependent upon the weight of the object placed atop the device 10. The pressure sensing and converting CPU unit 26 is the sensing recipient of the fluid pressure generated within the fluid circuit as a result.

After removal of the object, the spacers 36 act to resiliently spread the upper and lower support plates 34 and 32, respectively, apart back to their at-rest position, generally equal to the thickness of the bladders 20 so that relatively little, if any, pressure remains within the fluid circuit.

PRESSURE SENSING AND CONVERTING SIGNAL

The pressure sensing and converting CPU unit 26, the details of which are here described, includes circuitry which is of a well-known nature to one skilled in the art. A number of approaches may be taken, all of which have as their purpose to accurately sense the fluid pressure generated within the fluid circuit defined hereinabove and then to produce an electrical output signal at 28 which will activate the liquid crystal display 30 so as to provide viewable indicia representative of the weight of an object applied atop the device 10.

One approach to designing the CPU unit 26 is through the use of a voltage controlled oscillator (VCO). This approach, in combination with a solid state pressure measuring sensor such as the MOTOROLA MPX 200 or the MOTOROLA MPX 5100 series of pressure transducers may be utilized. The later device includes its own amplifier and is well suited to be connected to a microprocessor contained within the CPU unit 26. Both of these MOTOROLA pressure transducers are available in suitable fluid pressure ranges. Where a signal amplifier is required, an operational amplifier (op-amp) may be provided between the pressure sensor and the VCO. The VCO generates a frequency directly correlated to its input voltage, the input voltage, after amplification, being proportionate to the weight applied to the device 10 based upon the fluid pressure generated within the fluid circuit. Typical schematic arrangements are shown and described in a published article in the August '92 edition of Electronics World + Wireless World at page 692.

Another approach, in conjunction with a suitable solid state pressure measuring sensor as previously described such as supplied by MOTOROLA, is through the use of an analog-to-digital (A to D) converter. A signal amplifier in the form of an op-amp may be used to increase the voltage of the signal being produced by the pressure sensor. This amplified signal is then fed into the A to D converter to provide a binary representation of the voltage input thereof. The A to D converter binary output is then fed into a microprocessor to then calculate the weight applied to the device 10.

Yet another approach in conjunction with a conventional amplified signal of a solid state pressure measuring sensor is through the use of a special function integrate circuit. External time period oscillators or an offset and output driver may also be required for this arrangement.

A simple digital panel meter may be also be used wherein the pressure sensor output, after amplification, is fed directly into the meter of the drivers typically built into the meter along with the meter display.

The preferred embodiment of the CPU unit 26 includes a piezo-resistive pressure transducer such as the MOTOROLA MPX 2700-GP, case type 350-01, which outputs a voltage proportional to the pressure applied to it. An instrumentation amplifier such as the MOTOROLA LM423N is used to convert this pressure transducer's output to a level that can drive an A to D convertor which, in turn is used to drive the LCD 30.

It should be noted that utilization of the electronic components within the CPU unit 26 as hereinabove described offer additional benefits of temperature compensation, automatic or manual zero adjust, high accuracy, relatively low hysteresis repeatability and a broad range of sensitivity or range selections.

Figure 2:
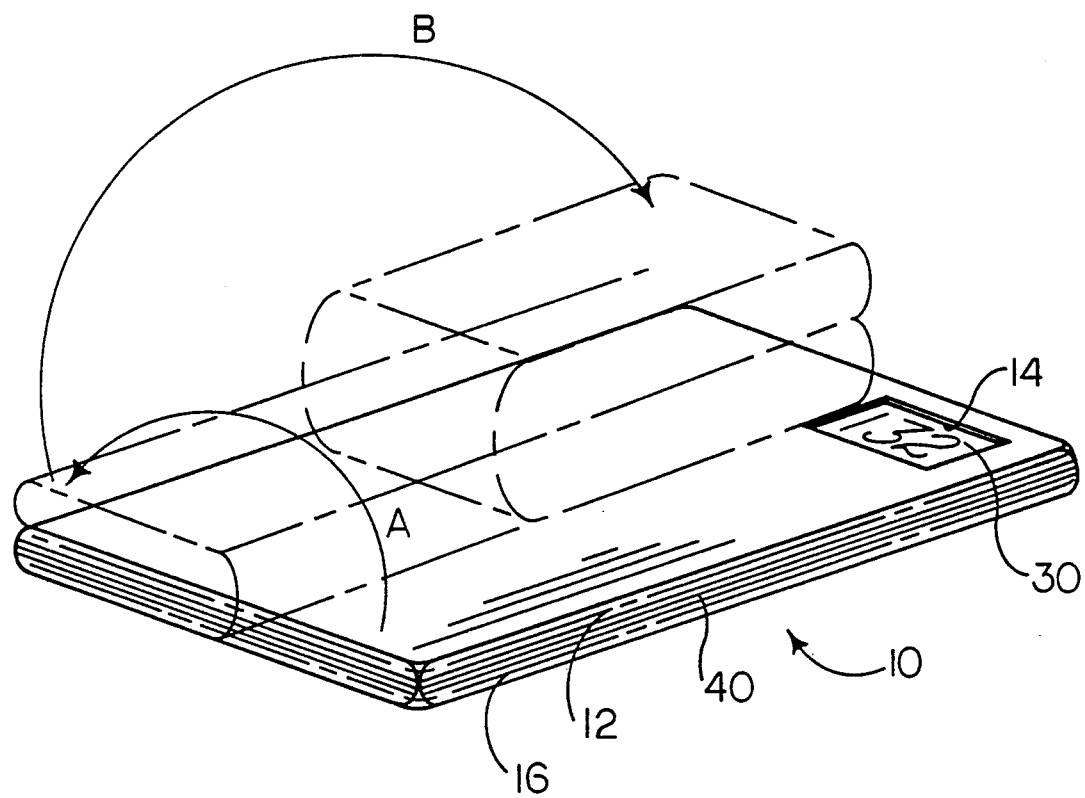
FIG. 2 is a perspective view of the invention depicting its folding characteristics in phantom.

Referring particularly to FIG. 2, the foldability of the present invention is three depicted. The bladders 20 in FIG. 1 are spaced apart so as to define one or more folding lines about which the bladder arrangement 18 may be doubled over. Rigid upper and lower panels 34 and 32, respectively, because they are generally sized and shaped so as to protectively embrace each bladder 20, do not interfere with the foldability about these imaginary fold lines.

The preferred embodiment of the invention 10 includes four such bladders as shown in FIG. 1 and thus two separate imaginary fold lines are defined so that the device 10 may be folded first in the direction of arrow A in half and then again in the direction of arrow B into a generally quarter-size shape from that of the invention 10 when opened in the flat ready for use.

The preferred embodiment 10 is also sized in overall dimension so as to serve as a weight scale for individuals, from child size up to full adult size. Thus, the upper and lower cover sheets 12 and 16, respectively, define a perimeter which is similar in size to that of the normal range of human feet and shoes. However, it should be understood that any other arrangement or array of bladders for other purposes should be viewed as being within the scope of this invention.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A portable weight measuring device comprising:

a plurality of closed flexible, bendable generally flat and non-elastic fluid-containing bladders;

each of said plurality of bladders including a thin rigid upper and lower support plate generally similar in size to that of each said bladder and positioned against an upper and lower surface, respectively, thereof;

said bladders arranged edge to edge so that each said upper support plate of each of said bladders are generally coplanar and define an upper weight-bearing surface;

compressible spacers positioned between each said upper and lower support plate of each said bladders for spacing each said upper and lower support plate of said bladders; apart a distance generally equal to a thickness of said bladders;

an upper and a lower flexible generally non-elastic cover sheet positioned against said weight bearing surface and a lower generally flat ground engaging surface defined collectively by a coplanar bottom surface of said lower support plate of each of said bladders;

a common edge around said upper and lower cover sheet connected therealong to enclose said plurality of bladders and said upper and lower support plate of each of said bladders;

a flexible tube connected and in fluid communication between each two adjacent said bladders whereby fluid within said bladders will flow between said bladders and a readout tube connected in fluid communication with one of said bladders;

a means connected and in fluid communication with said readout tube for sensing and converting fluid pressure within said plurality of bladders to an electrical signal proportional to a weight of an object applied atop said upper cover sheet, said bladders, said flexible tubes, said readout tube and said sending and connecting means defining a closed generally unpressurized fluid circuit when no object is applied atop said upper cover sheet;

readout means connected to said sensing and converting means for receiving aid electrical signal and for displaying viewable indicia representative of the weight of the object;

a viewing aperture formed through said upper cover sheet in alignment and registry with said readout means.

2. A portable weight measuring device as set forth in claim 1, wherein:

said bladders are spaced apart one to another to define at least one folding line whereby said device may be folded into a more compact size when not in use.

3. A portable weight measuring device as set forth in claim 2, wherein:

said weight bearing surface is sized to receive a person standing atop said upper cover sheet whereby said device may be used to determine the weight of the person.

* * * * *